(12) United States Patent
Oda

(10) Patent No.: US 12,385,776 B2
(45) Date of Patent: Aug. 12, 2025

(54) WINDSHIELD FOR BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 408 days.

(21) Appl. No.: 18/012,197

(22) PCT Filed: Jul. 6, 2020

(86) PCT No.: PCT/JP2020/026409
§ 371 (c)(1),
(2) Date: Dec. 21, 2022

(87) PCT Pub. No.: WO2022/009266
PCT Pub. Date: Jan. 13, 2022

(65) Prior Publication Data
US 2023/0304848 A1    Sep. 28, 2023

(51) Int. Cl.
*G01G 21/28* (2006.01)
*G01G 21/22* (2006.01)

(52) U.S. Cl.
CPC .......... *G01G 21/286* (2013.01); *G01G 21/22* (2013.01)

(58) Field of Classification Search
CPC .............................. G01G 21/286; G01G 21/22
USPC ........................................................ 177/181
See application file for complete search history.

(56) References Cited

U.S. PATENT DOCUMENTS

| | | | |
|---|---|---|---|
| 9,612,151 B2* | 4/2017 | Tachibana | G01G 21/286 |
| 10,119,854 B2* | 11/2018 | Kuhlmann | G01G 21/286 |
| 11,002,591 B2* | 5/2021 | Buchmann | G01G 21/23 |
| 12,140,471 B2* | 11/2024 | Oda | G01G 21/286 |
| 12,146,783 B2* | 11/2024 | Oda | G01G 21/286 |
| 2018/0106665 A1 | 4/2018 | Feldotte et al. | |
| 2024/0271989 A1* | 8/2024 | Oda | G01G 21/286 |

FOREIGN PATENT DOCUMENTS

| | | | |
|---|---|---|---|
| JP | S62-179615 A | 8/1987 | |
| JP | H04-221720 A | 8/1992 | |
| JP | H05-62825 U | 8/1993 | |
| JP | 05322638 | * 12/1993 | |
| JP | H05-322638 A | 12/1993 | |
| JP | H07-83744 A | 3/1995 | |
| JP | 2000-162028 A | 6/2000 | |
| JP | 2009-36583 A | 2/2009 | |
| WO | WO-2015074734 A1 * | 5/2015 | G01G 21/286 |

* cited by examiner

*Primary Examiner* — Jacques M Saint Surin
(74) *Attorney, Agent, or Firm* — Studebaker Brackett PLLC

(57) ABSTRACT

The windshield includes an outer windshield defining a weighing chamber, and an inner windshield disposed inside the outer windshield and covering the weighing pan, the outer windshield includes a pair of left and right sliding doors openable and closable in side surfaces, and the inner windshield is provided with an opening in a surface facing one of the sliding doors, and a shielding wall is provided at a lower portion of the opening. An air flow generated when the sliding door of the outer windshield is opened or closed moves along a floor surface of the outer windshield toward the weighing pan, but is blocked by the shielding wall and does not flow into the inside of the inner windshield.

6 Claims, 4 Drawing Sheets

WINDSHIELD FOR BALANCE

TECHNICAL FIELD

The present invention relates to a windshield to be used for a balance, particularly for a high-resolution balance.

BACKGROUND ART

Conventionally, a balance is provided with a windshield to prevent air flows around a weighing pan, for example, wind from an air conditioner, breath of a person at the time of weighing, air flow generated when a person walks, etc., from acting as a wind pressure on a load-applied portion centered on the weighing pan and adversely influencing weighing. The windshield is provided with an opening and closing door for placing a specimen to be weighed on the weighing pan, and when this opening and closing door is opened and closed, an air flow is generated. This air flow is attenuated as it moves inside the windshield after the opening and closing door is closed, however, in the course of this movement, when the air flow hits the weighing pan, it adversely influences weighing. This adverse influence is particularly pronounced with a high-resolution balance, for example, a balance having a resolution as high as $1/10,000,000$.

As a measure to avoid this adverse influence, conventionally, there is known a balance (Patent Literature 1) configured so that, inside the windshield, another windshield is provided to cover the weighing pan. For example, inside an outer windshield formed into a ceilinged cylindrical shape and having an opening in a side wall, a bottomed cylindrical inner windshield is provided which has an opening in a side wall and a bottom plate positioned below the opening and turnably supported by three rollers, and a weighing pan is disposed inside this inner windshield.

CITATION LIST

Patent Literature

[Patent Literature 1] Japanese Unexamined Patent Application Publication No. H05-322638

SUMMARY OF INVENTION

Technical Problem

In the balance described in Patent Literature 1, the inner windshield turns without being in contact with the outer windshield, and when the openings of both windshields match, the windshields are made into an open state, and when the openings do not match, the windshields are made into a closed state. Further, the inner windshield turns in a state where the bottom plate is supported by the rollers, and the rollers are thus positioned lower than the opening of the inner windshield, so that dust generated during this turning falls due to its own weight, and does not flow in the direction toward the weighing pan. Further, when there is a down flow flowing downward from above, air that has flowed in from the opening of the outer windshield flows down so as to pass by the rollers through a gap between the outer windshield and the inner windshield, and does not flow in the direction toward the weighing pan.

However, in a case where air flows horizontally, when the windshields are in an open state, air that has flowed into the inside of the inner windshield through the respective openings flows mainly along the bottom plate of the inner windshield in the direction toward the weighing pan. Further, even when the windshields are in a closed state, air that has flowed into the space defined by the respective side walls of the outer windshield and the inner windshield from the opening of the outer windshield flows into the inside of the inner windshield along the bottom plate from the opening of the inner windshield, and flows in the direction toward the weighing pan. As just described, in the balance described in Patent Literature 1, there is a problem in which the inner windshield only functions as a shutter to open and close the opening of the outer windshield, and cannot block inflow of air flowing horizontally toward the inside of the inner windshield, so that air hits the weighing pan, and adverse influence of the air flow during weighing cannot be avoided.

An object of the present invention is to provide a windshield for a balance which solves this problem.

Solution to Problem

In order to solve the problem described above, a windshield for a balance according to the present invention includes an outer windshield defining a weighing chamber, and an inner windshield disposed inside the outer windshield and covering a weighing pan, wherein the outer windshield has an openable and closable sliding door in a side surface, and the inner windshield is provided with an opening in a surface facing the sliding door, and a shielding wall is provided at a lower portion of the opening of the inner windshield.

Since a shielding wall is provided at a lower portion of the opening of the inner windshield, air that has flowed in from an opening portion that is formed by opening the sliding door of the outer windshield moves along a floor surface of the outer windshield toward the inner windshield, but is blocked by the shielding wall and does not flow into the inside of the inner windshield. Moreover, placement of a specimen on a weighing pan before weighing and taking-out of a specimen after weighing can be performed through an opening portion formed in the outer windshield and the opening of the inner windshield.

When an upper end of the shielding wall is set at substantially the same height position as a height position of the weighing pan, inflow of air to the inside of the inner windshield can be reliably blocked, and a sufficient opening area necessary for performing a work to place a specimen on the weighing pan or take out a specimen can be secured.

Further, when the sliding door is provided in each of a pair of side surfaces of the outer windshield, and the inner windshield is provided detachably or rotatably, and is configured to be installed so that the opening of the inner windshield faces the desired one of the sliding doors, a work to place or take out a specimen through the desired side surface of the outer windshield is enabled.

Advantageous Effects of Invention

According to the present invention, the windshield is configured as a double structure by being provided with an outer windshield and an inner windshield, and a shielding wall is provided at a lower portion of an opening of the inner windshield, and accordingly, adverse influences of air flows on the weighing pan provided inside the inner windshield are prevented, so that smooth and reliable weighing can be performed, and accurate weighing of a particularly high-resolution balance can be realized.

DESCRIPTION OF EMBODIMENT

Figure 1:
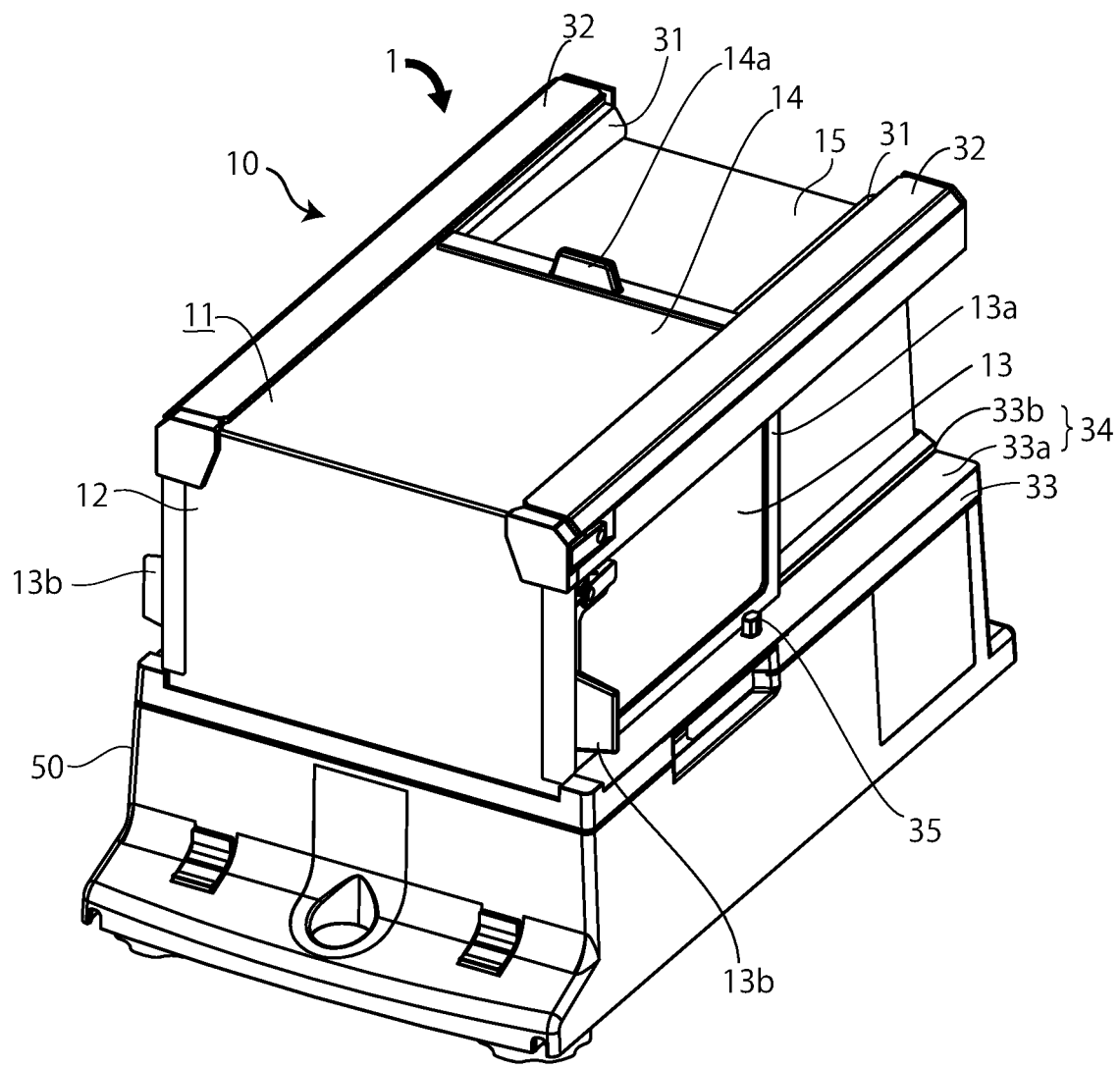
FIG. 1 is a perspective view illustrating an embodiment of a balance according to the present invention, omitting illustration of the inside of an outer windshield.

Hereinafter, a preferred embodiment of the present invention will be described based on the accompanying drawings. For the sake of convenience, the respective accompanying drawings illustrate components of the outer windshield and the inner windshield as components that are not see-through, and illustration of the inside is omitted.

As illustrated in FIGS. 1 to 4, a balance 1 includes a housing 50 in which an electromagnetic balance type or load-cell type mass sensor (illustration omitted) is housed, and a weighing pan 51 which is joined to the mass sensor and on which a specimen is placed. Further, an annular wall 52 is provided so as to surround the weighing pan 51. A windshield 10 is provided on an upper surface of the housing 50. The windshield 10 consists of an outer windshield 11 defining a weighing chamber S, and an inner windshield 21 disposed inside the outer windshield 11 and covering the weighing pan 51. The windshield 10 prevents air flows around a weighing chamber S, for example, wind from an air conditioner, breath of a person at the time of weighing, air flow generated when a person walks, etc., from acting as a wind pressure on a load-applied portion centered on the weighing pan 51 and influencing weighing.

The outer windshield 11 includes a front plate 12, a pair of left and right sliding doors 13 and 13 for respectively opening and closing side surfaces, an upper surface door 14 for opening and closing an upper surface, and a back plate 16 forming one of the surfaces of a box-shaped case 15 closing a back surface, and defines a weighing chamber S having a substantially rectangular parallelepiped shape. The front plate 12, the pair of sliding doors 13 and 13, and the upper surface door 14 are preferably made of glass or resin, and transparent so that an internal state can be observed. Further, to prevent generation of static electricity, the glass is preferably a conductive glass having a conductive film provided on the surface, and the resin is desirably a conductive resin with conductivity. Note that the outer windshield 11 may be provided to be attachable to and detachable from the housing 50 by a publicly known attaching and detaching mechanism, or may be fixed to the housing in an undetachable manner.

Figure 2:
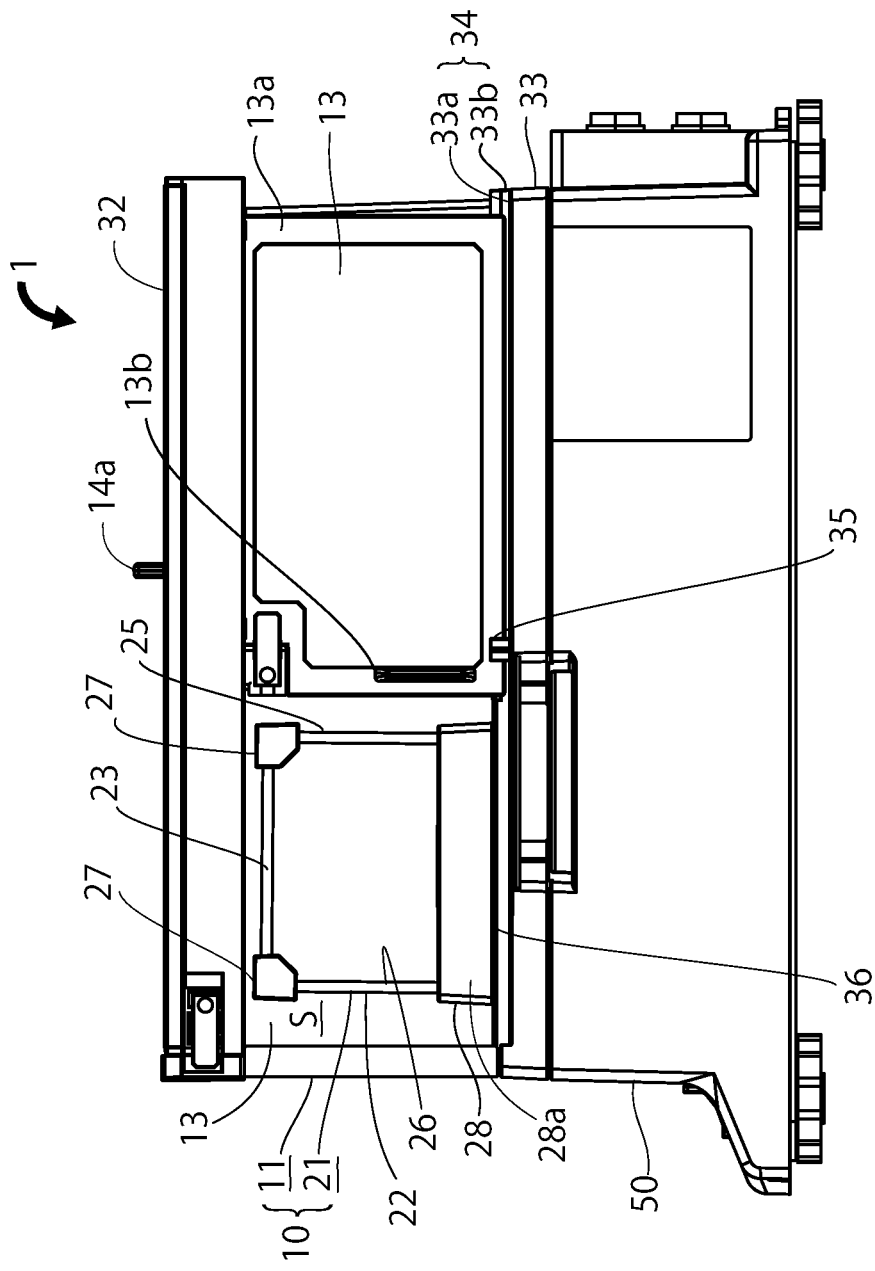
FIG. 2 is a side view illustrating a state where a sliding door of an outer windshield is opened.

Next, the pair of left and right sliding doors 13 and 13 will be described. The sliding doors 13 and 13 have the same configuration, so that only one will be described. As illustrated in FIGS. 1 and 2, the sliding door 13 has a quadrilateral outer frame 13a, and an upper portion of the outer frame 13a is slidably supported and suspended by an upper frame 31 and a cylinder box 32 provided along one side portion of the upper surface door 14. The sliding door 13 is configured to reciprocate by a driving force of an air cylinder (not illustrated) disposed inside the cylinder box 32. This reciprocation is caused when a lower portion of the outer frame 13a is guided by a guide rail 34 that is L-shaped in section and formed of a horizontal portion 33a and a rise portion 33b of a lower frame 33. A lower end of the outer frame 13a of the sliding door 13 is preferably in a non-contact state where the lower end is separated from the horizontal portion 33a of the lower frame 33. Note that the sliding door 13 can be reciprocated manually as well as by a driving force of the air cylinder, and for manual movement, a handle 13b is provided at the front plate 12 side.

As can be best understood in FIG. 1, the upper surface door 14 is configured to be capable of reciprocal movement in a front-rear direction along guide grooves not illustrated that are provided in the cylinder boxes 32 and 32. The upper surface door 14 is provided with a handle 14a at a case 15 side so as to be manually moved.

As illustrated in FIGS. 1 to 4, on the horizontal portions 33a of the lower frames 33, at positions along movement paths of the respective sliding doors 13 and 13, restricting projections 35 and 35 that restrict displacements of the lower ends of the respective sliding doors 13 and 13 in separating directions from the rise portions 33b of the lower frames 33, that is, vertical portions of the guide rails 34 are provided for the sliding doors 13 and 13, respectively. The shapes of the restricting projections 35 and 35 are octagonal prisms although not clearly illustrated in the figures. The restricting projections 35 and 35 are always at positions where their side surfaces can come into contact with the lower end portions of the corresponding sliding doors 13 and 13 regardless of whether the sliding doors 13 and 13 are in closed states or in open states. These restricting projections 35 and 35 prevent wobbling of lower portions of the sliding doors 13 and 13 that are not in contact with the horizontal portions 33a of the guide rails 34, thereby securing smooth movements of the sliding doors 13 and 13. Further, the restricting projections 35 and 35 are always at positions where they can come into contact with lower end portions of the corresponding sliding doors 13 and 13, so that the wobbling prevention described above is reliably realized in the entire ranges of the movements of the sliding doors 13 and 13. Note that the shapes of the restricting projections 35 and 35 may be polygonal prisms other than octagonal prisms, or may be columns.

Figure 3:
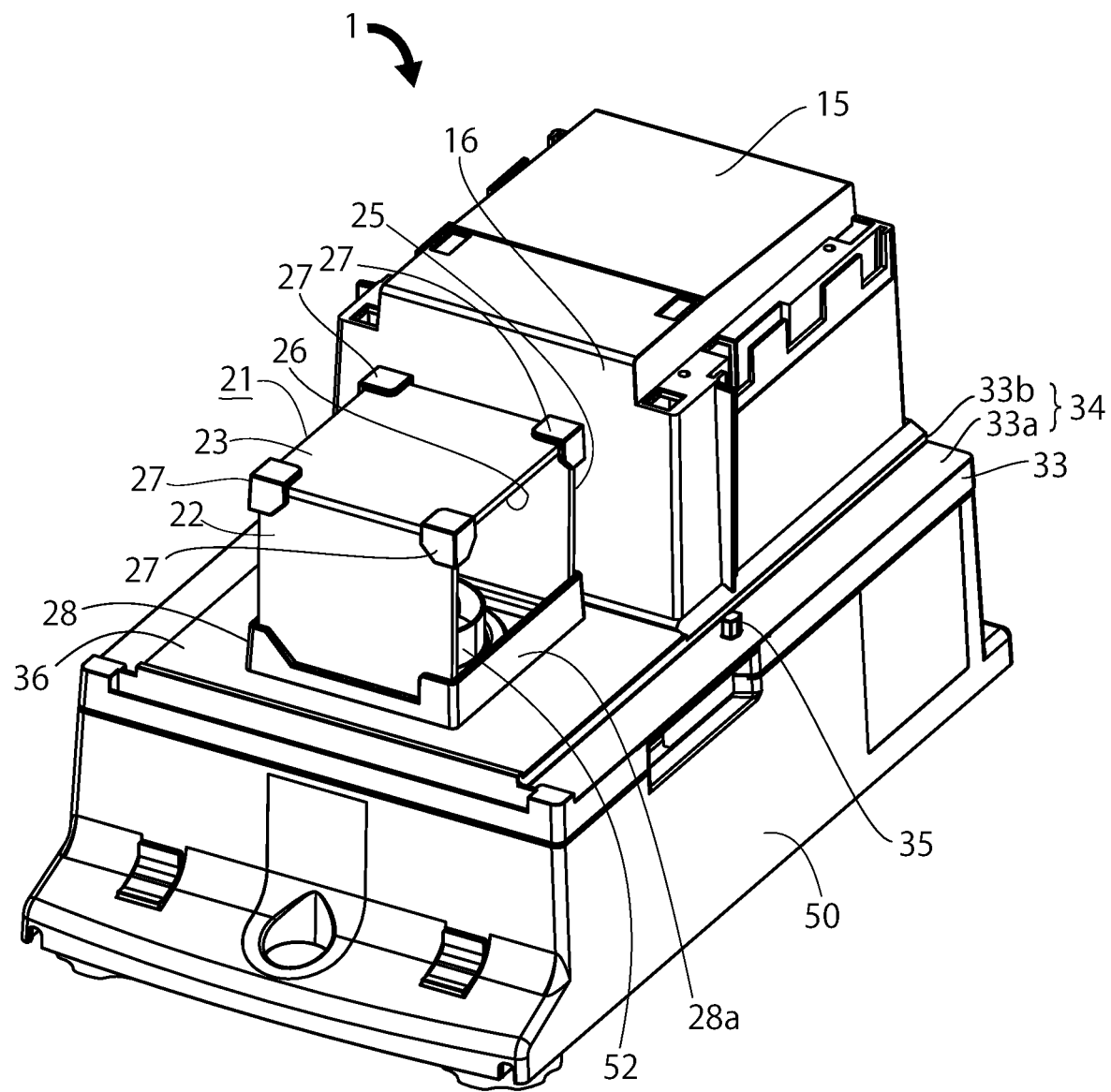
FIG. 3 is a perspective view, omitting the outer windshield and cylinder boxes.
Figure 4:
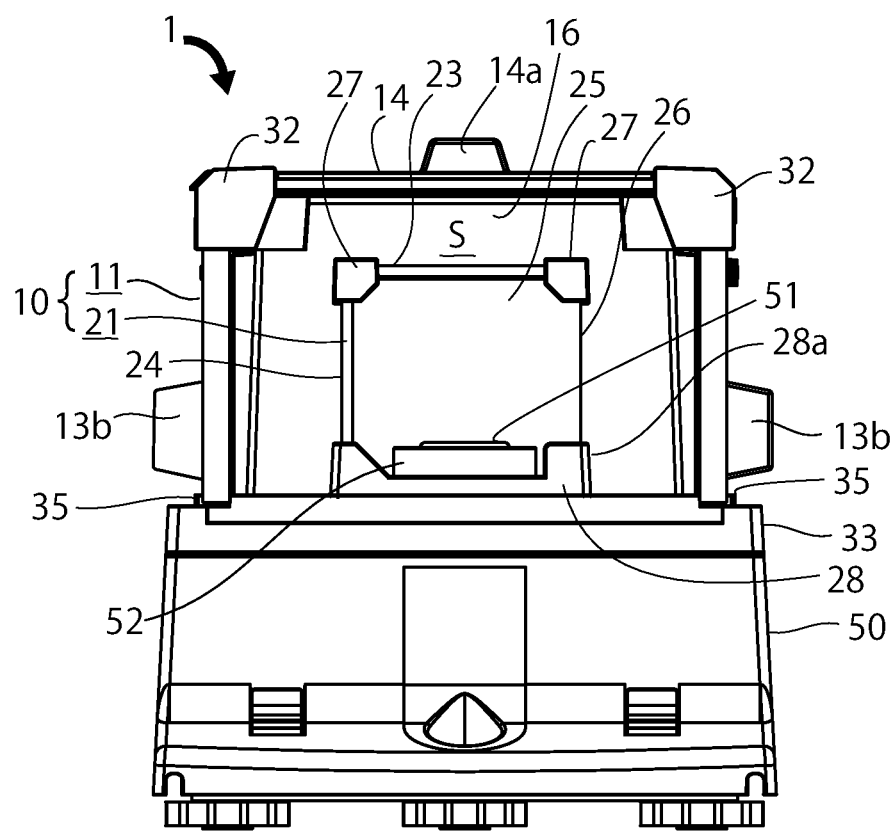
FIG. 4 is a front view illustrating a height relationship between a shielding wall and a weighing pan, partially omitting the outer windshield and the inner windshield.

As illustrated in FIGS. 2 to 4, the inner windshield 21 includes a front plate 22, an upper surface plate 23, side surface plates 24, a back plate 25, and an opening 26 formed by opening one of the side surfaces. Respective upper end corner portions of the front plate 22, the side surface plates 24, and the back plate 25 are joined and fixed to four corner portions of the upper surface plate 23 by resin-made fixtures 27, 27, 27, and 27. Respective lower end corner portions of the front plate 22, the side surface plates 24, and the back plate 25 are fixed by a resin-made quadrilateral fixing frame 28. The inner windshield 21 is thus formed in a rectangular parallelepiped shape having an opening in one surface.

The inner windshield 21 is disposed on an upper surface plate 36 of the lower frame 33 by the fixing frame 28 so that the inner windshield covers the weighing pan 51, and the opening 26 faces the sliding door 13 of the right side surface, and is detachably attached by a publicly known attaching and detaching mechanism (not illustrated). Therefore, it is also possible that the inner windshield 21 is disposed so that the opening 26 faces the other sliding door 13 (refer to FIG. 2). A portion of the fixing frame 28 positioned corresponding to a lower portion of the opening 26 constitutes a shielding wall 28a. A height position of an upper end of this shielding wall 28a is substantially the same as a height position of the weighing pan 51. Normally, the height position of the upper end of the shielding wall 28a is the same as or slightly higher than the height position of the weighing pan 51, which more reliably blocks inflow of air to the inside of the inner windshield 21. On the other hand, when the height position of the upper end of the shielding wall 28a is slightly lower than the height position of the weighing pan 51, the inflow blocking function can be maintained although the reliability decreases. Moreover, in this case, when an aluminum-foil-made, ceramic-made, or platinum-made boat-shaped shallow container called a boat that contains a liquid or powder specimen mainly for element analysis, is picked up with tweezers, moved horizontally, and placed on the weighing pan 51 without spilling the specimen, the work can be easily and reliably performed without being obstructed by the shielding wall 28a.

Preferably, the front plate 22, the upper surface plate 23, the side surface plates 24, and the back plate 25 of the inner windshield 21 are made of glass or resin, and are transparent so that an internal state can be observed. Further, to prevent generation of static electricity, preferably, the glass is conductive glass having a conductive film provided on the surface, and the resin is a conductive resin with conductivity.

In the configuration described above, when performing weighing, as illustrated in FIG. 2, the sliding door 13 of the right side surface of the outer windshield 11 is opened, and from the opened side surface, a specimen is placed on the weighing pan 51 through the opening 26 of the inner windshield 21, and the sliding door 13 is then closed to bring the weighing chamber S into a closed state. During this weighing, the weighing chamber S is in the closed state, so that the weighing chamber S is not influenced from the outside.

At the time of weighing of the specimen, when an operation to open and close the sliding door 13 is performed to place the specimen on the weighing pan 51, air may flow into the inside of the windshield 10 along the upper surface plate 36 of the lower frame 33. However, even when the air flows from the outer windshield 11 to the inner windshield 21 in the direction toward the weighing pan 51, the air is blocked by the shielding wall 28a of the inner windshield 21 and flows along the fixing frame 28 in the direction toward the side surface plates 24, so that the air does not flow into the inside of the inner windshield 21, and does not reach the weighing pan 51. Therefore, with the weighing pan 51 on which the specimen has been placed, accurate weighing is always performed without being influenced by air flows. Even when dust flows in together with the air flow, similar to the air flow, dust does not flow into the inside of the inner windshield 21.

On the other hand, when it is desired to perform a weighing work by opening the sliding door 13 of the left side surface (refer to FIG. 2), the opening 26 of the inner windshield 21 needs to be arranged to face this sliding door. Therefore, the inner windshield 21 is detached once from the upper surface plate 36, and the inner windshield 21 is attached to the upper surface plate 36 so that the opening 26 faces the opposite side. Then, the sliding door 13 of the left side surface of the outer windshield 10 is opened, and from the opened side surface, a specimen is placed on the weighing pan 51 through the opening 26 of the inner windshield 21, and the sliding door 13 is then closed to bring the weighing chamber S into a closed state, and weighing can thus be performed.

It should be noted that the present invention is not limited to the above-described embodiment, and for example, the shapes of the outer windshield 11 and the inner windshield 21 are not limited to rectangular parallelepiped shapes, and may be cylindrical shapes whose upper surfaces are closed.

Further, it is also possible that the outer windshield 11 is formed into a rectangular parallelepiped shape, and the inner windshield 21 is formed into a box body that is U-shaped in a planar view. As with the rectangular parallelepiped shape, this inner windshield 21 formed as a box body that is U-shaped in a planar view is preferred since a sufficient opening can be secured as compared with a cylindrical shape. When the inner windshield 21 is configured to be rotatable, by rotating the inner windshield in a predetermined direction, the opening 26 of the inner windshield 21 can be caused to face the sliding door 13 on a desired side of the outer windshield 11. This rotatable configuration can be realized by using a conventionally publicly known method.

The annular wall 52 also has a function to block an air flow and accompanying dust from reaching the weighing pan 51, however, in the present invention, inflow of air to the inside of the inner windshield 21 is blocked by the shielding wall 28a, so that the annular wall 52 does not necessarily have to be provided.

REFERENCE SIGNS LIST

1 Balance
10 Windshield
11 Outer windshield
12 Front plate
13 Sliding door
14 Upper surface door
16 Back plate
21 Inner windshield
22 Front plate
23 Upper surface plate
24 Side surface plate
25 Back plate
26 Opening
27 Fixture
28 Fixing frame
28a Shielding wall
34 Guide rail
50 Housing
51 Weighing pan
S Weighing chamber

The invention claimed is:

1. A windshield for a balance, comprising:
an outer windshield defining a weighing chamber; and an inner windshield disposed inside
the outer windshield and covering a weighing pan, wherein
the outer windshield has an openable and closable sliding door in a side surface, and
the inner windshield is provided with an opening opened in a surface facing the sliding door, and a shielding wall that blocks inflow of air to the inner windshield is provided at a lower portion of the opening of the inner windshield.

2. The windshield for a balance according to claim 1, wherein
an upper end of the shielding wall is at substantially the same height position as a height position of the weighing pan.

3. The windshield for a balance according to claim 1, wherein
the sliding door is provided in each of a pair of side surfaces of the outer windshield, and the inner windshield is provided detachably, and configured to be installed so that the opening of the inner windshield faces one of the sliding doors.

4. The windshield for a balance according to claim 2, wherein
   the sliding door is provided in each of a pair of side surfaces of the outer windshield, and
   the inner windshield is provided detachably, and configured to be installed so that the opening of the inner windshield faces one of the sliding doors.

5. The windshield for a balance according to claim 1, wherein
   the sliding door is provided in each of a pair of side surfaces of the outer windshield, and
   the inner windshield is provided rotatably, and configured to be installed so that the opening of the inner windshield faces one of the sliding doors.

6. The windshield for a balance according to claim 2, wherein
   the sliding door is provided in each of a pair of side surfaces of the outer windshield, and
   the inner windshield is provided rotatably, and configured to be installed so that the opening of the inner windshield faces one of the sliding doors.

* * * * *